Jan. 15, 1952   W. C. MOELLER   2,582,345
EYESHIELD STRUCTURE
Original Filed Oct. 7, 1946

INVENTOR.
William C. Moeller
BY
ATTORNEY

Patented Jan. 15, 1952

2,582,345

UNITED STATES PATENT OFFICE 2,582,345

EYESHIELD STRUCTURE

William C. Moeller, Kansas City, Mo., assignor, by mesne assignments, to Parmelee Plastics Company, Kansas City, Mo., a corporation of Missouri Original application October 7, 1946, Serial No. 701,638. Divided and this application March 22, 1948, Serial No. 16,332

1 Claim. (Cl. 88—55)

This invention has to do with devices for aiding vision or protecting the eyes against glare, dust or the like and more particularly to spectacles of the kind having an eye shield provided with a nose bridge and side pieces or bows for passing over the ears.

This is a division of my co-pending application, Serial No. 701,638, filed October 7, 1946, now Patent No. 2,513,507, issued July 4, 1950, and entitled "Eye Shield."

The primary object of this invention is to provide eye shield structure having a unitary shield for covering the eyes and provided with a notch intermediate its ends for receiving a removable nose piece of semi-rigid material, capable of conforming to the shape of the nose.

Another important object of this invention is to provide eye shield structure having a sweat bar cooperable with the aforesaid nose piece in holding the shield spaced from the wearer's face.

A further object of this invention is to provide an eye shield having a bridge provided with a specially designed nose piece, formed from pliable material and having a resilient member therein for holding the same in place through the medium of notches formed in the shield at said bridge.

Other objects will be made clear during the course of the following specification, referring to the accompanying drawing, wherein.

Figure 1:
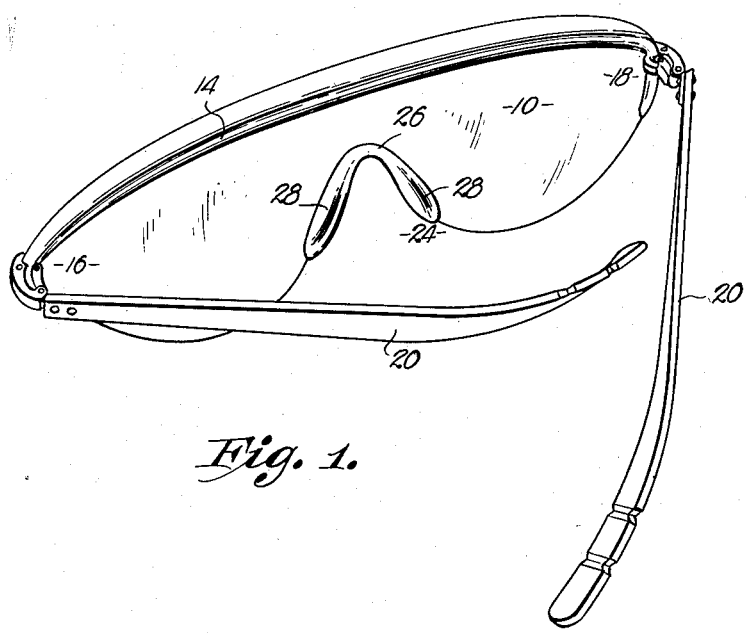
Fig. 1 is a perspective view of eye shield structure made in accordance with my present invention.
Figure 2:
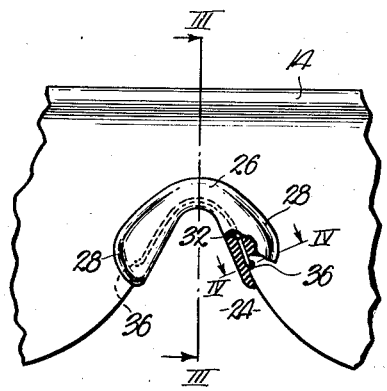
Fig. 2 is an enlarged fragmentary inside view, parts being broken away for clearness.
Figure 3:
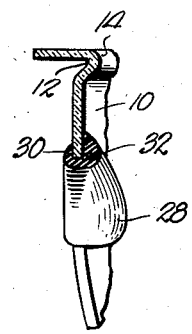
Fig. 3 is a cross sectional view taken on line III—III of Fig. 2.

The eye covering portion of lens structure of the spectacles chosen for illustration takes the form of a unitary body 10, particularly useful as protecting goggles. It is contemplated, however, that any form of covering, such as the conventional two-piece lens structure of ground glass may be used as well as the plastic material shown in the drawing, when formed to present a groove and head or ridge 12 and 14 respectively.

This bead 14 extends the entire length of body 10 along the inner, marginal edge thereof and near its normally top edge to rest against the forehead of the wearer when placed in use, while the groove 12 is in opposed relation thereto on the outer face of body 10. Bead 12 and groove 14, also, extend downwardly along a portion of the ends of body 10 to receive a respective adjustable clamping element 16 and 18.

These elements 16 and 18 are identical, each mounting one of the side members or bows 20 and 22, and are described in detail in my aforesaid divisional application.

Body 10 is formed to present a bridge generally designated by the numeral 24, which is of the usual inwardly cut-out portion, midway between the ends of body 10 and curved generally to fit the nose. A nose piece 26 is formed from semi-rigid plastic or like material capable of readily conforming to the contour of the nose, as well as to the contour of bridge 24. Laterally projecting pads 28 rest against the sides of the nose when worn in the usual manner.

Figure 5:
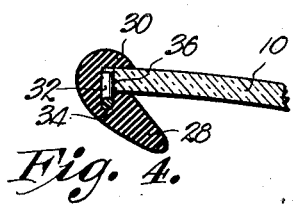
Figure 4:
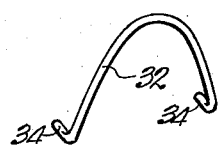
Fig. 4 is an enlarged fragmentary cross sectional view taken on line IV—IV of Fig. 2; and, Fig. 5 is a perspective view of the resilient holding member, per se.

The inner edge of nose piece 26 is overlapped as at 30 for receiving the edges of body 10 forming bridge 24, as is clear in Figs. 4 and 5, and when the nose piece 26 is formed, a substantially U-shaped member 32 is molded therein. This member is made from resilient material and in such manner as to tend to move outwardly at the free ends thereof in engagement with the edges of bridge 24. These free ends of member 32 have laterally projecting ears 34 that enter a respective notch 36 in body 10 when assembled.

Pressing together of the legs of member 32 will move the ears 34 from notches 36 for replacement of nose piece 26 when desired, as for remolding the same to more properly fit the nose of the wearer as desired.

Through the medium of these two adjustable features, namely, elements 16 and 18 and nose piece 26, it is possible for anyone needing such devices to reset and reshape the spectacles to fit, irrespective of any peculiar conditions that may exist either in the contour of his face or the working conditions with which he is associated.

The plastic material from which nose piece 26 is made is readily obtainable on the open market and is sufficiently pliable to conform to desired shapes, yet sufficiently rigid to hold such shape when placed in use. The member 32, in addition to serving as a mounting means for nose piece 26, also aids in maintaining the same in the shape desired. As shown, member 32 lies along the innermost face of body 10, and therefore serves to add rigidity to the wings or pads 28.

It is furthermore of importance that the pliable nature of nose piece 26 lends exceptional comfort to the wearer and will not tend to slide from position on the nose when perspiration is present.

The wings or pads 28, together with the bridge portion thereof joining pads 28, extend sufficiently far beyond the innermost face of body 10 to cooperate with the elongated sweat bar or bead 14 in holding the shield 10 spaced from the wearer's eyes, eye lashes and cheeks.

Although only one modification of the instant invention has been shown and described, it is understood that other eye shield structures may be made without departing from the spirit of the invention or scope of the appended claim.

Having thus described the invention, what is claimed as new and desired to be secured by Letters Patent is:

In spectacles, an eye shield having a nose recess formed therein; a substantially U-shaped padding element adapted to rest upon the nose of the wearer of the spectacles and of pliable material capable of conforming to the shape of the nose and to the shape of said recess, said element being fitted within the recess at the bight thereof and having a groove receiving the proximal edge of the shield, and a substantially U-shaped resilient member embedded within the element having the ends of the legs thereof biased apart for holding the element in frictional engagement with said edge of the shield, each of said ends of the legs of said member being provided with a laterally projecting ear extending into said groove, said shield having ear-receiving notches formed therein at said edge thereof.

WILLIAM C. MOELLER.

REFERENCES CITED

The following references are of record in the file of this patent:

UNITED STATES PATENTS

| Number | Name | Date |
| --- | --- | --- |
| 2,444,498 | Cochran | July 6, 1948 |
| 2,450,711 | Banchard | Oct. 5, 1948 |
| 2,479,754 | Marks | Aug. 23, 1949 |